United States Patent
Thoria et al.

(10) Patent No.: US 11,356,366 B2
(45) Date of Patent: *Jun. 7, 2022

(54) INTEROPERABILITY BETWEEN SYMMETRIC AND ASYMMETRIC EVPN IRB MODES

(71) Applicant: Cisco Technology, Inc., San Jose, CA (US)

(72) Inventors: Samir Thoria, Saratoga, CA (US); Ali Sajassi, San Ramon, CA (US); Lukas Krattiger, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,221

(22) Filed: Feb. 22, 2021

(65) Prior Publication Data

US 2021/0226890 A1  Jul. 22, 2021

Related U.S. Application Data

(63) Continuation of application No. 16/375,810, filed on Apr. 4, 2019, now Pat. No. 10,958,570.

(51) Int. Cl.
*H04L 45/50* (2022.01)
*H04L 45/64* (2022.01)
*H04L 12/46* (2006.01)
*H04L 12/66* (2006.01)
*H04L 45/00* (2022.01)

(52) U.S. Cl.
CPC ........ *H04L 45/507* (2013.01); *H04L 12/4633* (2013.01); *H04L 12/4641* (2013.01); *H04L 12/66* (2013.01); *H04L 45/64* (2013.01); *H04L 45/66* (2013.01)

(58) Field of Classification Search
CPC .............................. H04L 45/507; H04L 12/66
USPC .......................................................... 709/238
See application file for complete search history.

(56) References Cited

U.S. PATENT DOCUMENTS

| 2005/0120089 A1 | 6/2005 | Kang et al. |
| 2009/0129260 A1* | 5/2009 | Qian .................. H04L 41/0631 370/216 |
| 2018/0331949 A1* | 11/2018 | Busari .................. H04L 45/586 |

OTHER PUBLICATIONS

Sajassi, A., et al., "BGP MPLS-Based Ethernet VPN," Internet Engineering Task Force (IETF), Request for Comments: 7432, Feb. 2015, ietf.org, 56 pages.

(Continued)

*Primary Examiner* — Wing F Chan
*Assistant Examiner* — Leon Y Tseng
(74) *Attorney, Agent, or Firm* — Polsinelli PC

(57) ABSTRACT

A system and method are disclosed for enabling interoperability between asymmetric and symmetric Integrated Routing and Bridging (IRB) modes. A system is configured to receive a route advertisement, examine the label fields of the route advertisement, and determine whether Layer 2 or Layer 3 information is conveyed. The system is further configured to build a route advertisement to advertise to a second device based on whether Layer 2 or Layer 3 information is conveyed in the first route advertisement.

20 Claims, 6 Drawing Sheets

(56) References Cited

OTHER PUBLICATIONS

Rosen, E., et al., BGP/MPLS IP Virtual Private Networks (VPNs), Network Working Group, Request for Comments: 4364, Feb. 2006, ietf.org, 47 pages.

Cai, D., et al. "Integrated Routing and Bridging in EVPN," draft-sajassi-l2vpn-evpn-inter-subnet-forwarding-05, Cai et al., Draft Integrated Routing and Bridging in EVPN, Oct. 2, 2014, ietf.org, 26 pages.

* cited by examiner

INTEROPERABILITY BETWEEN SYMMETRIC AND ASYMMETRIC EVPN IRB MODES

CROSS-REFERENCE TO RELATED APPLICATION

This is a continuation of U.S. Non-Provisional patent application Ser. No. 16/375,810, filed on Apr. 4, 2019, the full disclosure of which is expressly incorporated herein by reference in its entirety.

TECHNICAL FIELD

The subject matter of this disclosure relates in general to the field of computer networks, and more specifically improving the accuracy and efficiency of forwarding tenant traffic between devices supporting different modes.

BACKGROUND

A network is a group of interconnected computing devices that can exchange data. An Ethernet Virtual Private Network (EVPN) may be used to extend and optimize remote Layer 2 (L2) and Layer 3 (L3) customer networks through an intermediate network. A network endpoint is a physical or virtual device connected to a computer network. An endpoint offers information, services, and applications to users or other nodes connected to the network. An endpoint is a node that is assigned a unique L2 network route, such as Media Access Control (MAC) route, and a unique L3 network route, such as an Internet Protocol (IP) route.

A tenant needing Integrated Routing and Bridging (IRB) services on a Provider Edge (PE) device requires an IP Virtual Routing and Forwarding (IP-VRF) table and a MAC Virtual Routing and Forwarding table (MAC-VRF). A MAC-VRF can have Bridge Tables (BTs) that are connected to an IP-VRF via an IRB interface. There are as many BTs as there are subnets, for a given tenant, and thus there are also as many IRB interfaces between the tenant IP-VRF and the associated BTs. IP-VRF is identified by its corresponding route target and route distinguisher and MAC-VRF is also identified by its corresponding route target and route distinguisher.

There are two models to accomplish inter-subnet forwarding with EVPN—asymmetric IRB and symmetric IRB modes. In symmetric IRB mode, the inter-subnet forwarding between two PE devices is done between their associated IP-VRFs. In asymmetric IRB mode, the inter-subnet forwarding between two PE devices is done between their MAC-VRFs and BTs. Different vendors use different modes and once a network is built using one mode, the other mode cannot be used in the same network. With symmetric IRB, all traffic egressing and returning from a VXLAN Tunnel Endpoint (VTEP) uses the same VNI and the bridge-route-route-bridge sequence offers flexibility for large-scale multitenant deployments. With respect to asymmetric IRB, there are differences concerning which VNI the IP packets travel through due to the differences between where and how the routing lookups are done. These differences cannot be reconciled unless the configuration is changed. Thus, it is advantageous for products to be placed in deployments that work with either of these modes.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
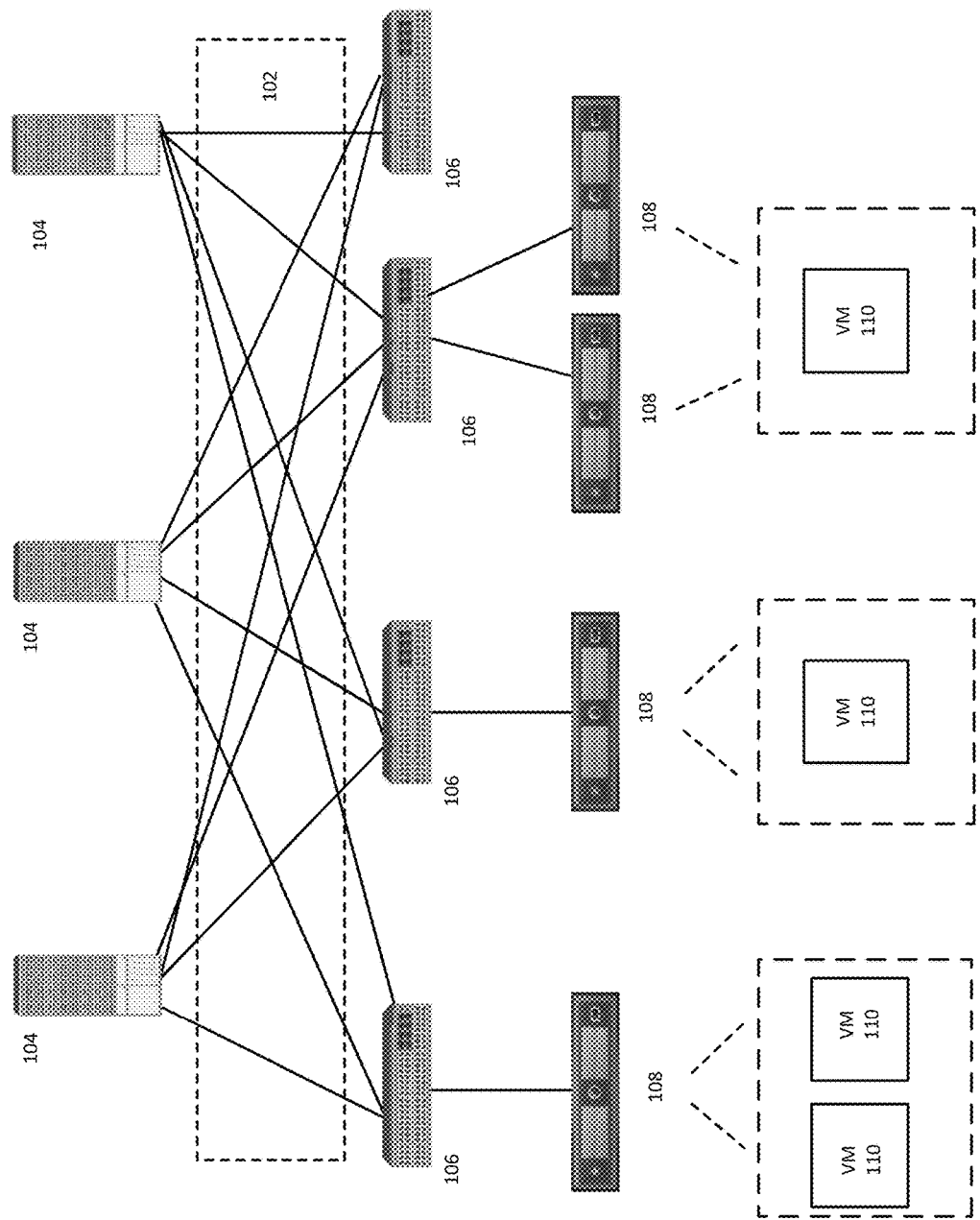
FIG. 1 is a simplified schematic block diagram illustrating a network environment configured to implement the method for enabling interoperability between asymmetric and symmetric modes, in accordance with the various techniques described in this disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A system and method are disclosed for enabling interoperability between asymmetric and symmetric Integrated Routing and Bridging (IRB) modes. A hybrid IRB mode is introduced, in which the Provider Edge (PE) device detects the IRB operation it receives and deploys an IRB PE that behaves the same way. The function of the PE device is to forward traffic between receivers. When a symmetric formatted route is received from a symmetric IRB PE, the hybrid PE device is configured to process the EVPN Route Type 2's (MAC/IP Advertisement Route) as follows: Media Access Control (MAC) portion into the MAC-VRF and its respective Bridge-Table (BT) and Internet Protocol (IP) portion into the IP-VRF and its respective routing table. When an asymmetric formatted route is received from an asymmetric IRB PE, the hybrid PE device is configured to process the MAC/IP Advertisement Route as follows: MAC portion into the MAC-VRF and its respective BT and MAC plus IP portion combined installed in the local ARP table pointing to the asymmetric IRB PE. As a result, the receiving PE device directs inter-subnet traffic forwarding based upon the advertisement it receives and facilitates interoperability between implementations with symmetric IRB and implementations with asymmetric IRB. This method is accomplished with no change to the control plane or configuration of the IRB nodes. This technology allows manufacturers to sell one type of device that will be able to work with both symmetric and asymmetric IRB modes.

EXAMPLE EMBODIMENTS

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Various embodiments relate to a hybrid PE node that receives an MAC/IP Advertisement Route as an egress switch. The hybrid PE node receives a MAC/IP Route advertisement of an IP network and acts as hybrid IRB node. The hybrid IRB node creates and advertises an EVPN Route Type 5 (IP Prefix Route) towards the Symmetric IRB nodes, and forwards traffic providing seamless interoperability between different IRB modes and inter-subnet connectivity.

FIG. 1 is a simplified schematic block diagram illustrating a network environment 100 configured to implement the method for enabling interoperability between asymmetric and symmetric IRB modes, in accordance with the various techniques described in this disclosure. The network environment 100 includes a set of interconnected networking elements in a leaf and spine architecture. Each spine switch/router 104 in the network is connected to a leaf switch/router 106 and the leaf switch/router 106 is connected to one or more servers 108. The servers can each host Virtual Machine (VM) 110 or host one or more virtual endpoints. The one or more servers 108 and one or more VMs 110 can be referred to as the host facing interface.

The network environment 100 may be a Multiprotocol Label Switching (MPLS)/Internet Protocol (IP) network for intra-subnet connectivity among endpoints that can be physical or virtual. FIG. 1 and other examples presented herein describe the use of Ethernet Virtual Private Network (EVPN) for exchanging the endpoint MAC and IP routes. In certain examples, the overlay network 102 employs an EVPN-based IRB. The overlay network 102 is referred to as an EVPN IRB network. The leaf switch/router 106 can be called an "edge device" and it is where the IRB function is hosted on.

The EVPN IRB network provides inter-subnet forwarding as well as the ability of a VM 110 to migrate from one server 108 to another within the same or different network without change to its existing MAC and IP address. The leaf switch/router 106 also performs Virtual Extensible Local Area Network (VXLAN) encapsulation and decapsulation on frames coming from and going to VM 110 running on the attached host servers 108. VXLAN is a L2 overlay scheme on a L3 network. The encapsulations can be label-based encapsulations, such as MPLS, SR-MPLS or IP-based encapsulations such as VXLAN, SRv6, GENEVE, GPE.

In an embodiment, devices that support VXLANs are called virtual tunnel endpoints (VTEPs). VTEPs can be end hosts or network switches or routers. VTEPs encapsulate VXLAN traffic and de-encapsulate that traffic when it leaves the VXLAN tunnel. To encapsulate an Ethernet frame, VTEPs add a number of fields, including a VXLAN header that includes a 24-bit field, which is called the VXLAN network identifier (VNI). For example, border leaf router encapsulates and decapsulates frames for VM 110 running on one of the servers 108.

Figure 2:
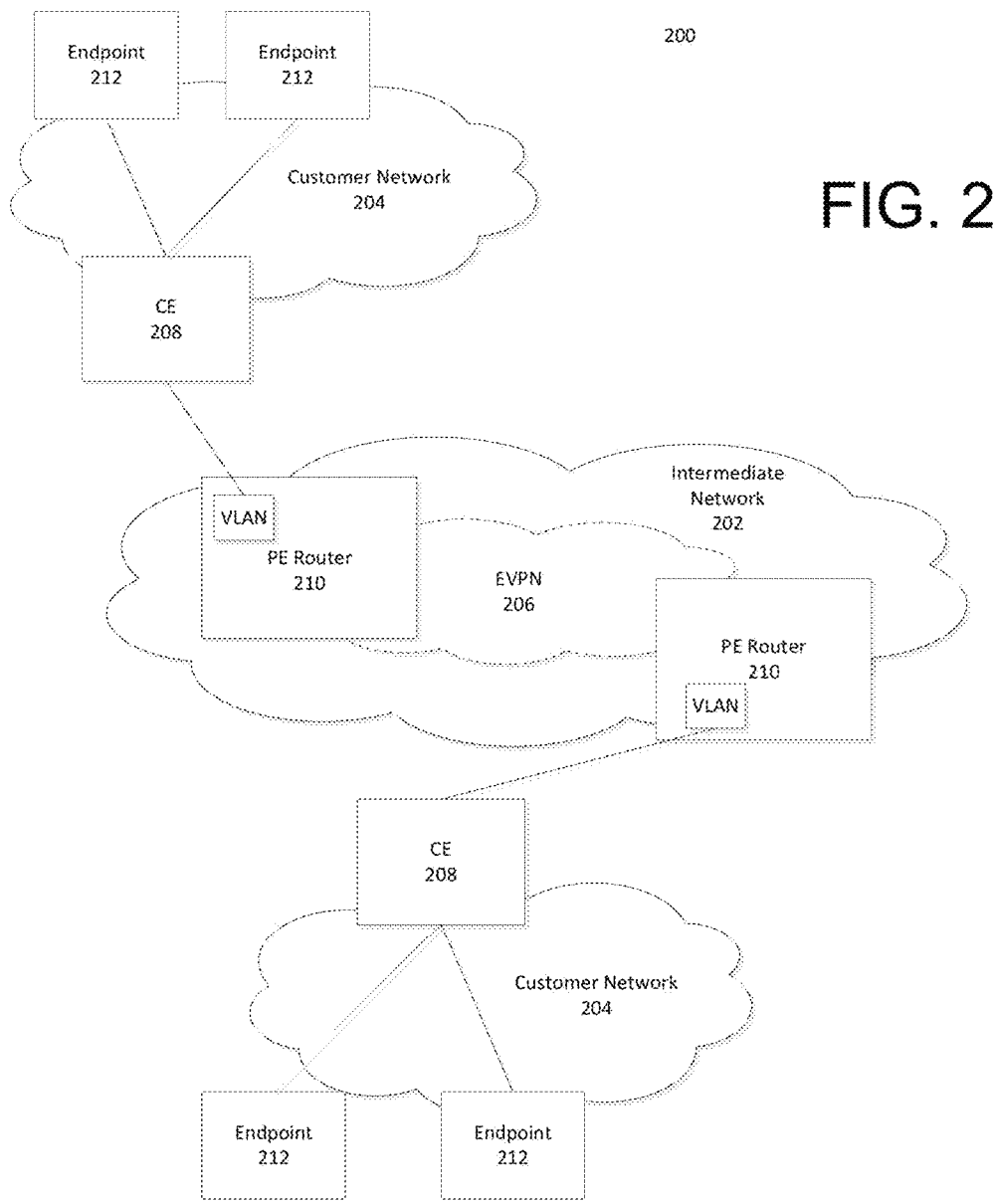
FIG. 2 is a simplified schematic block diagram illustrating a network device that implements techniques to improve inter-subnet forwarding in an EVPN when delivering traffic to nodes that support different IRB functionality, in accordance with the various techniques described in this disclosure.

FIG. 2 is an illustration showing a network device that implements techniques to improve inter-subnet forwarding in an EVPN when delivering traffic to nodes that support different IRB functionality in accordance with techniques described in this disclosure. One or more of the PE routers 210 may implement IRB, such that each PE router 210 is able to provide both L3 routing and L2 switching between different L2 domains within a single router. An IRB includes a routing interface for an IRB subnet as well as a Bridge Domain (BD) and in turn facilitates simultaneous L2 bridging and L3 routing from the BD. One or more IRB interfaces may be used to locally route inter-subnet traffic. When a PE device 210 with IRB capability receives tenant traffic, it can locally bridge the intra-subnet traffic and locally route the inter-subnet traffic on a packet by packet basis.

Each of the PE routers 210 may implement Virtual Routing Functionality (VRF), where each PE router 210 includes one or more VRF instances. Each VRF instance in a given router may represent a logically separate routing and forwarding instance. This includes both a corresponding routing table and forwarding information in the control plane and forwarding plane for the router. PE 210 is configured with IRB having a BD that provides L2 reachability to L3 subnet that includes endpoints 212. In some embodiments, Customer Edge (CE) router 208 can be a Layer-2 only PE while PE 210 is a Layer-2/Layer-3 PE hosting the IRB function. PE routers 210 locally learn MAC addresses for customer endpoints. PE router 210 may receive an IP packet for routing using IRB, the IP packet sourced by endpoint 212 and destined for endpoint 212. The IP packet may have a destination MAC address that corresponds to the IRB interface MAC address. PE router 210 determines the IP packet is to be inter-subnet routed and performs an IP lookup in VRF.

In some cases, PE routers 210 may learn the IP addresses associated with respective MAC addresses in the control plane between the CEs 208 and the PE routers 210. PE devices 210 provide customer equipment associated with customer networks 204 with access to intermediate networks 202. PEs 210 coupled to CE routers 208 of customer networks 204 via attachment circuits. An intermediate network 202 can be a service provider network, which represents a publicly accessible computer network that is owned and operated by a service provider.

A type of business class data service offered by service provider network 12 includes EVPN 206. EVPN 206 is a service that provides a form of L2 and L3 connectivity across an intermediate network, such as service provider network, to interconnect an L2 customer network with an L3 customer network that are usually located in two different geographic areas.

In the example of FIG. 2, when providing the EVPN 206 service to customer networks, PEs 210 and CEs 208 typically perform MAC address learning to efficiently forward L2 network communications in system. As PEs 210 and CEs 208 forward Ethernet frames, the routers learn L2 information, including MAC addressing information for customer equipment within the network. PEs 210 and CEs 208 typically store the MAC addressing information in MAC tables associated with respective interfaces.

As PEs 210 learn the MAC address for customer equipment reachable through local attachment circuits, the PEs 210 utilize route advertisements of a L3 routing protocol, such as a Border Gateway Protocol (BGP), to share the learned MAC addresses and to provide an indication that the MAC addresses are reachable through the particular PE that is issuing the route advertisement. In the EVPN implemented in system, each of PEs advertises the locally learned MAC addresses to other PEs using a BGP route advertisement, referred to herein as "EVPN MAC/IP advertisement route."

As further described below, an EVPN MAC/IP advertisement route typically specifies an individual MAC address of customer equipment along with additional forwarding information, such as a route descriptor, route target, L2 segment identifier, MPLS label, etc. In EVPN, PEs advertise the MAC addresses learned from the CEs that are connected to them, along with an MPLS label, to other PEs in the control plane using Multiprotocol BGP. PEs 210 may perform both local learning and remote learning of MAC addresses. Each of PEs 210 utilizes EVPN MAC/IP advertisement route specifying the MAC addresses learned by other PE routers 210 to determine how to forward L2 communications to MAC addresses that belong to CEs 208 connected to other PEs 210.

Figure 3A:
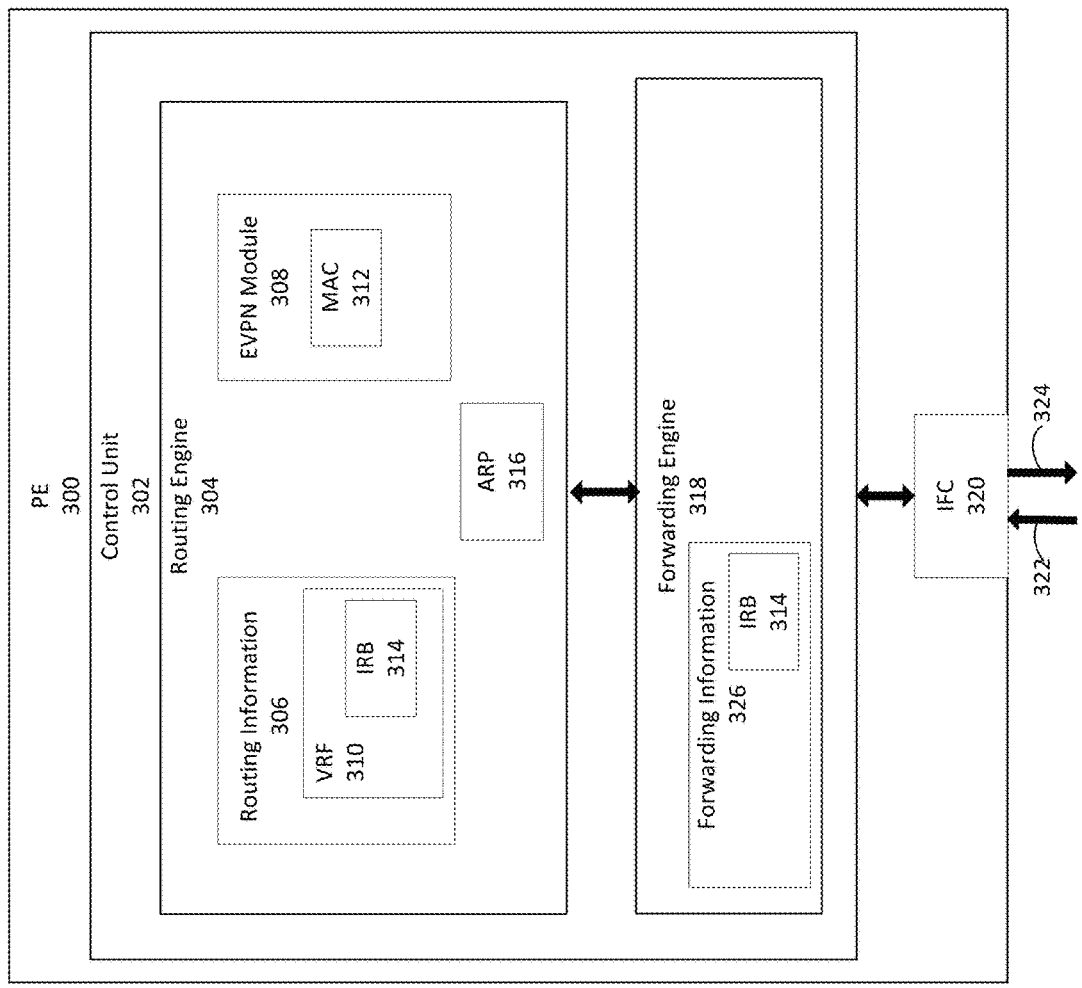
FIG. 3A is a simplified schematic block diagram illustrating an example of a PE network device, in accordance with the various techniques described in this disclosure.

FIG. 3A illustrates an example of a PE network device 300, in accordance with the techniques described in this disclosure. PE 300 includes a control unit 302 that includes a routing engine 304 coupled to a forwarding engine 318. Control unit 302 may be implemented solely in software, or hardware, or may be implemented as a combination of software, hardware, or firmware. Control unit 302 may include one or more processors which execute software instructions. In that case, the various software modules of control unit 302 may comprise executable instructions stored on a computer-readable medium, such as computer memory or hard disk.

Routing engine 304 provides an operating environment for various protocols that execute at different layers of a network stack. Network protocols include routing protocols, such as BGP. PE 300 includes one or more interface cards (IFC) 320 that receive packets via incoming links 322 and send packets via outbound links 324. Incoming links 322 and outbound links 324 may represent physical interfaces, logical interfaces, or some combination thereof. Control unit 302 determines routes of received packets and forwards the though the IFC 320.

Forwarding engines 318 represent hardware and logic functions that provide high-speed forwarding of network traffic. In general, when PE 300 receives a packet via one of incoming links 322, one of forwarding engines identifies an associated next hop for the IP packet by traversing the programmed forwarding information 326 based on information within the packet. The ingress forwarding engine or a different egress forwarding engine will forward the packet on one of outbound links 324 mapped to the corresponding next hop.

Forwarding engine 318 receives IP packets on incoming links that are destined for one of the PE routers 300 in the EVPN. Forwarding engine 318 determines whether the destination customer MAC address of the IP packets is included in the one of MAC tables associated with the EVPN. If the MAC address is included in the one of MAC tables, then PE forwards the IP packets to the destination PE router based on forwarding information associated with the EVPN. If the MAC address is not included in the one of MAC tables, PE floods the IP packets to all of the PE routers based on forwarding information associated with the EVPN.

VRF 310 is configured with a routing interface of IRB 314, the logical interfaces for which are configured to forward information of forwarding engine. Each IRB 314 interface provides a L3 interface for a L2 subnet, and VRF 310 configures forwarding information to bridge traffic between the domains. Routing information may configure IRBs 314 using routing information provided by VRF 310.

An ARP (Address Resolution Protocol) lookup is done to identify host MAC address and adds an Ethernet encapsulation in the header of an IP packet if a valid MAC address is found. A lookup function verifies whether or not an ARP entry exists in the ARP table 316. ARP tables 316 represent a data structure storing a plurality of address resolution entries each associating an L2 addresses with a corresponding L3 address that has been learned by PE router 300 for a customer device.

Figure 3B:
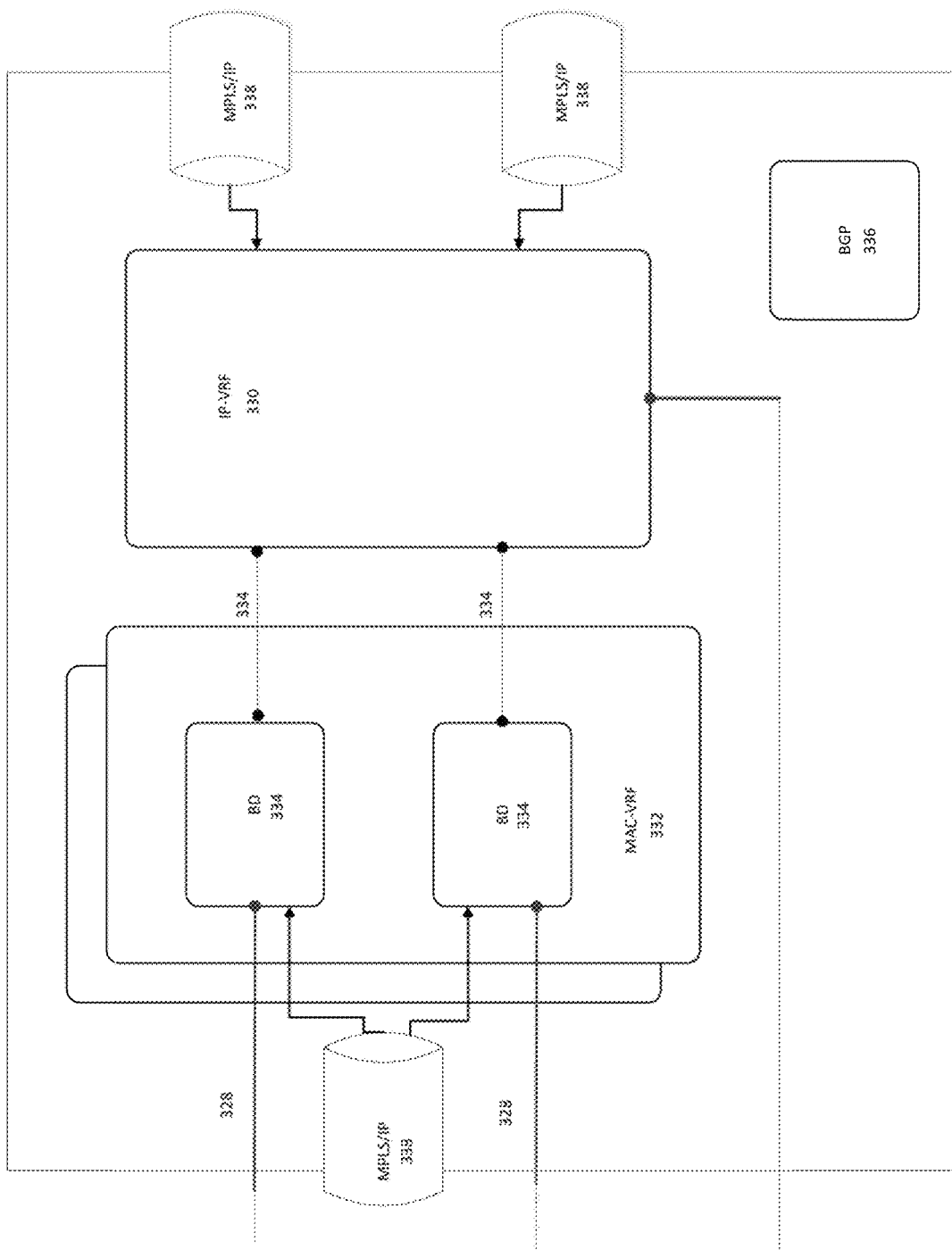
FIG. 3B is a simplified schematic block diagram illustrating an example of a gateway PE, in accordance with the various techniques described in this disclosure.

FIG. 3B is a simplified schematic block diagram illustrating an example of a gateway PE, in accordance with the various techniques described in this disclosure. Each PE router maintains a number of separate forwarding tables, including the VPN Routing and Forwarding tables (VRFs). Every PE attachment circuit 328 is associated, by configuration, with one or more VRFs. In the simplest case, a PE attachment circuit 328 is associated with exactly one VRF. When an IP packet is received over a particular attachment circuit 328, its destination IP address is looked up in the associated VRF. The result of that lookup determines how to route the packet.

A tenant needing IRB services on a PE, requires an IP-VRF 330 along with one or more MAC-VRFs 332. A MAC-VRF 332 can consist of one or more Bridge Tables (BTs) where each BT corresponds to a Broadcast Domain (BD) 334. If service interfaces for an EVPN PE are configured in VLAN-Based mode then there is only a single BT per MAC-VRF 332. If service interfaces for an EVPN PE are configured in VLAN-Aware Bundle mode then there are several BTs per MAC-VRF 332. Each BT is connected to a IP-VRF 330 via a L3 interface called IRB interface 334. For a given tenant, there are as many BTs as there are subnets and thus there are also as many IRB interfaces 334 between the tenant IP-VRF 330 and the associated BTs as shown in FIG. 3B. PE routers use BGP 336 to cause VPN routes to be distributed to each other. MPLS or IP tunnel 338 transports MPLS-label and payload from one PE to another.

Figure 4:
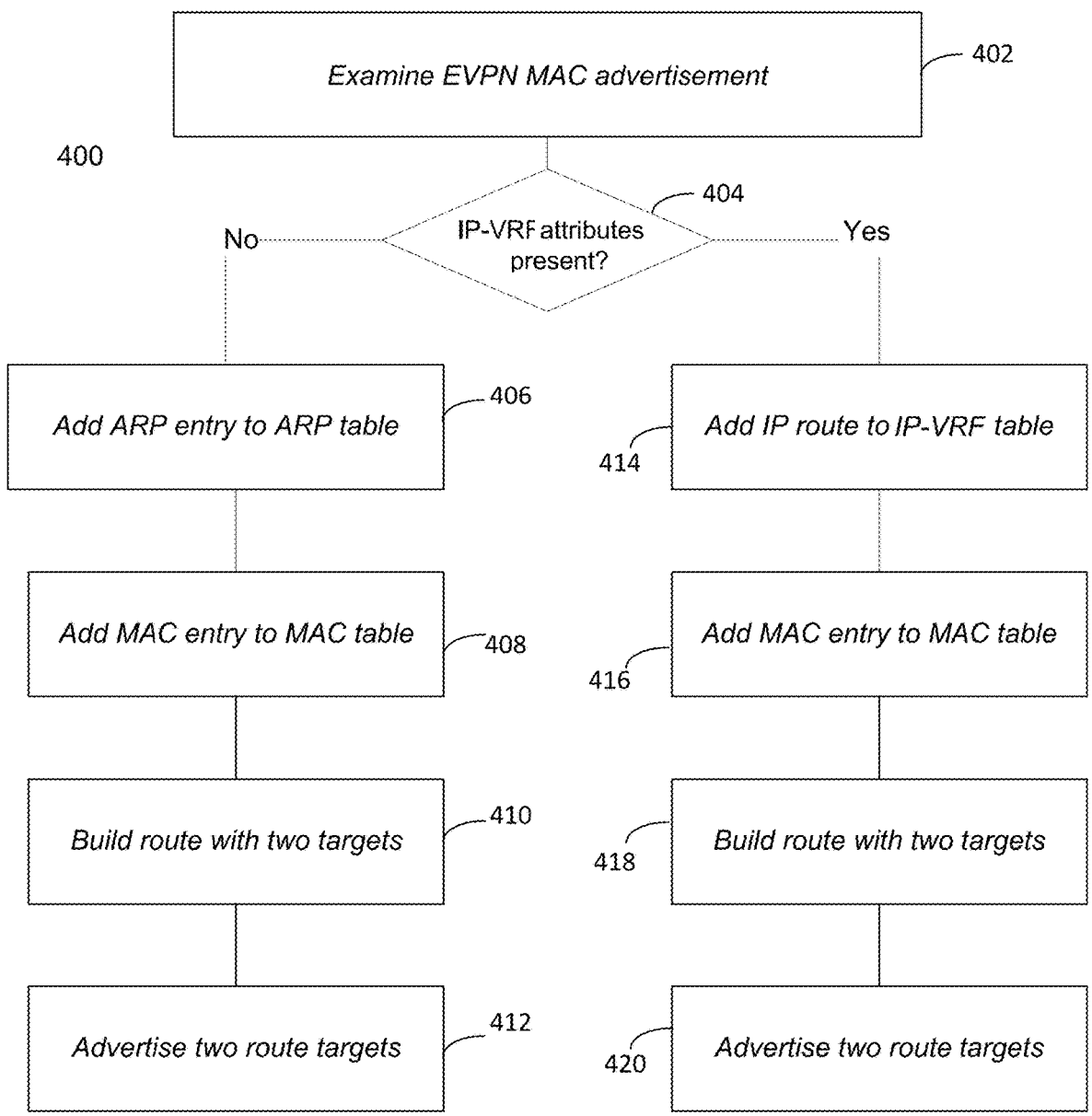
FIG. 4 is a process flow diagram illustrating the method performed by the hybrid IRB node of providing inter-subnet connectivity regardless of whether the egress PE is a symmetric IRB PE or an asymmetric IRB PE, in accordance with the various techniques described in this disclosure.

FIG. 4 illustrates a process flow diagram illustrating the method performed by the hybrid IRB node of providing inter-subnet connectivity regardless of whether the egress PE is a symmetric IRB PE or an asymmetric IRB PE. Inter-subnet communication is when a Tenant System (TS) wants to communicate with another TS belonging to a different subnet connected to the same PE node. Operation 400 is described with respect to PE 300 of FIG. 3. Routing engine 304 analyzes routing information 306 and generates forwarding information 326, which may be maintained in one or more tables.

The hybrid IRB node can be a receiving PE that receives and examines EVPN MAC/IP Advertisement Route with MAC VRF route target (block 402). The receiving PE learns the MAC and IP addresses of a TS via an ARP request. To advertise new routes, PE determines if the MPLS label for the first route advertisement includes IP-VRF attributes (block 404). If IP-VRF attributes are present, indicating that it is a symmetrically formatted route, the PE installs the MPLS Label2 field in the forwarding path to identify the corresponding IP-VRF. The PE adds the IP route to the IP-VRF table (block 414) and the MAC address to the MAC-VRF table (block 416). By doing this, it imports L2 information in BD that maps to BD route target and L3 information in route advertisement is also imported in VRF that maps to L3 route target (block 418). Then it programs a MAC entry in the BD table pointing to an advertising node and it creates a L3 host route based on the MAC and IP address in the route advertisement pointing to remote VXLAN Tunnel Endpoint (VTEP) or MPLS PE with per MPLS or VXLAN VNI encapsulation (block 420). This results in BGP next hop address of egress PE along with VPN MPLS label or VNI. The BGP route target of the IP-VRF is attached to the advertised route.

If the egress PE is the symmetric IRB PE, it will have the necessary information to program forwarding to do the symmetric IRB action, which receives a packet with both Label 1 and Label2 fields. If the receiving PE is an asymmetric IRB PE, the asymmetric IRB PE will ignore the Label2 field and create a local ARP entry and local MAC entry.

If IP-VRF attributes are not present, indicating that it is an asymmetrically formatted route, the hybrid PE creates an ARP entry with the IP and MAC route (block 406). Then it creates a local MAC entry in the MAC table (block 408). The PE imports L2 information in BD that maps to BD route target and programs MAC entry in BD table pointing to advertising node (block 410). Then it creates an adjacency on the egress IRB interface for MAC and IP (block 412). This results in BGP next hop address of egress PE along with VPN MPLS label or VNI. The BGP route target of the IP-VRF is attached to the advertised route.

If the egress PE is a symmetric IRB PE, it receives a packet with both Label1 and Label2 fields, which means it has the same encoding as and is operable with a symmetric IRB PE. For example, the symmetric IRB PE will import the IP host route into the corresponding IP-VRF based on the IP-VRF route target and the MAC address into the local MAC-VRF based on the MAC-VRF's route target. An asymmetric IRB PE would ignore the Label2 field because the IP-VRF attributes are not recognized by an asymmetric IRB PE.

Figure 5A:
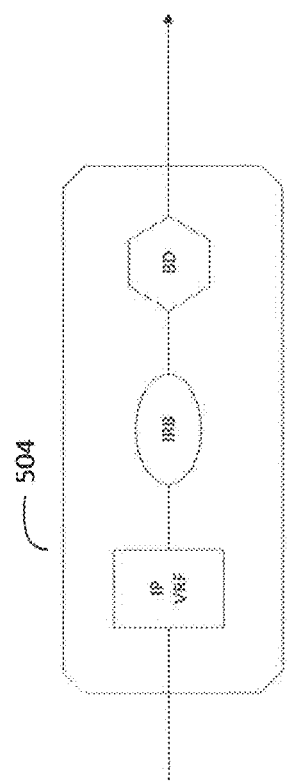
FIG. 5A is a simplified schematic block diagram illustrating the operation of a symmetric IRB PE, in accordance with the various techniques described in this disclosure.
Figure 5A:
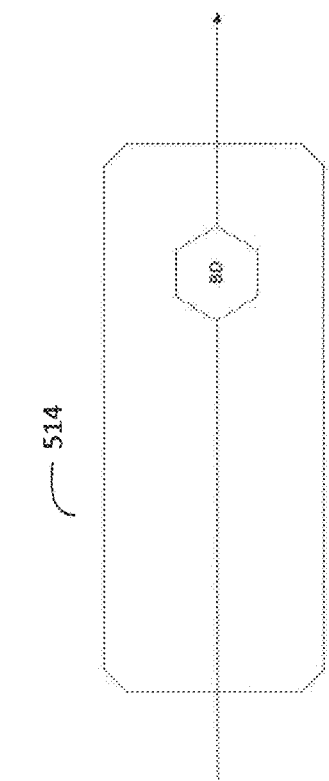

FIG. 5A illustrates the operation of a symmetric IRB PE 500. Generally, in a symmetric IRB PE 500, the ingress PE 502 performs an IP lookup in the associated IP-VRF table. The lookup identifies BGP next hop of egress PE 504 along with the encapsulation type and the associated MPLS or VNI values. The ingress PE 512 gets the destination MAC address for the IP address from its ARP table and encapsulates the packet with that destination router MAC address and sends the packet its destination subnet.

In a symmetric IRB PE 500, an EVPN MAC and IP advertisement route is built and advertised to the other PE's participating in the EVPN. The MPLS Label2 field is set to either an MPLS label or a VNI corresponding to the tenant's IP-VRF. The inclusion of MPLS Label2 field signals to the receiving PE that the route is for symmetric IRB mode. If the receiving PE only supports asymmetric IRB mode, then the receiving PE must ignore the Label2 field and install the MAC address in the corresponding MAC-VRF and the IP and MAC address in the ARP table. The forwarding is performed using the destination MAC address.

Figure 5B:
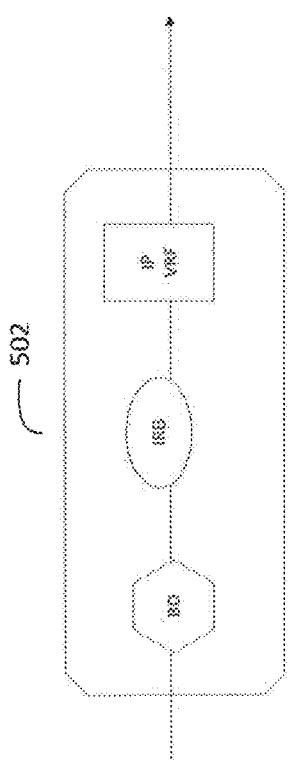
FIG. 5B is a simplified schematic block diagram illustrating the operation of an asymmetric IRB PE, in accordance with the various techniques described in this disclosure.
Figure 5B:
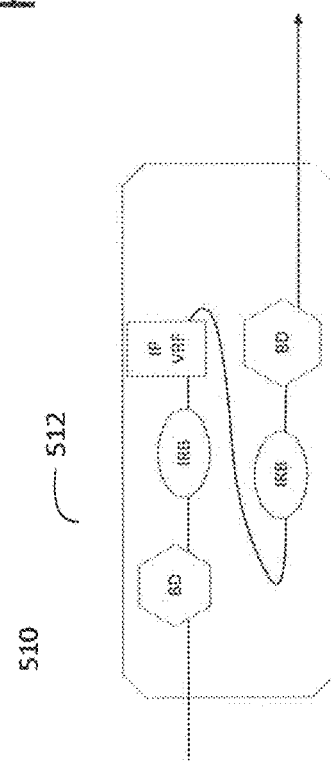

FIG. 5B illustrates the operation of an asymmetric IRB PE 510. Generally, in an asymmetric IRB PE 510, the ingress PE 512 performs an IP lookup in the associated IP-VRF table. The lookup identifies a local adjacency to the IRB interface associated with the egress PE's 514 MAC-VRF and BT. The ingress PE 512 gets the destination MAC address for the IP address from its ARP table and encapsulates the packet with that destination MAC address and sends the packet its destination subnet.

In an asymmetric IRB PE 510, an EVPN MAC and IP advertisement route is built and advertised to the other PE's participating in the EVPN. The route must not include an MPLS Label2 field. When a PE that only supports symmetric mode receives this route, it only imports the MAC address to the corresponding MAC-VRF table. A hybrid IRB PE would import the IP and MAC route into the ARP table.

The embodiments may be implemented as firmware, hardware, and/or software logic embodied in a tangible medium that, when executed, is operable to perform the various methods and processes described above. That is, the logic may be embodied as physical arrangements, modules, or components. A tangible medium may be any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   receiving an Ethernet Virtual Private Network (EVPN) Media Access Control/Internet Protocol (MAC/IP) Advertisement Route;
   examining the EVPN MAC/IP Advertisement Route;
   determining that Internet Protocol Virtual Route Forwarding (IP-VRF) attributes are carried in the EVPN MAC/IP Advertisement Route; and
   in response to determining the IP-VRF attributes are carried in the EVPN MAC/IP Advertisement Route, adding, based on information in the EVPN MAC/IP Advertisement Route, an IP route to an IP-VRF table, and
   adding a MAC entry to a MAC-VRF table identified by a Border Gateway Protocol (BGP) target of the MAC address.

2. The method of claim 1, further comprising:
   in response to determining the IP-VRF attributes are not carried in the EVPN MAC/IP Advertisement Route, adding, based on the information in the EVPN MAC/IP Advertisement Route, an Address Resolution Protocol (ARP) entry to an ARP table, the ARP entry including at least one of a MAC address and an IP address from the received the EVPN MAC/IP Advertisement Route.

3. The method of claim 2, further comprising:
building, based on the information, a second EVPN MAC/IP Advertisement Route; and
advertising the second EVPN MAC/IP Advertisement Route.

4. The method of claim 3, wherein the second EVPN MAC/IP Advertisement Route is advertised with two route targets, one for the Media Access Control Virtual Route Forwarding (MAC-VRF) and one for IP-VRF.

5. The method of claim 1, wherein adding the IP route with Virtual Route Forwarding (VRF) to the IP-VRF table is per VXLAN Network Identifier (VNI) encapsulation.

6. The method of claim 1, vs/herein the information is at least one of Layer 2 information or Layer 3 information.

7. The method of claim 1, wherein receiving the EVPN MAC/IP Advertisement Route occurs at an ingress switch.

8. The method of claim 1, further comprising:
building, based on the information, a second EVPN MAC/IP Advertisement Route; and
advertising the second EVPN MAC/IP Advertisement Route.

9. The method of claim 7, vs herein the second EVPN MAC/IP Advertisement Route is advertised with two route targets, one for the MAC-VRF.

10. A network device comprising:
at least one processor; and
at least one memory storing instructions, which when executed by the at least one processor, causes the at least one processor to:
receive an Ethernet Virtual Private Network (EVPN) Media Access Control/Internet Protocol (MAC/IP) Advertisement Route;
examine the EVPN MAC/IP Advertisement Route;
determine that Internet Protocol Virtual Route Forwarding (IP-VRF) attributes are carried in the EVPN MAC/IP Advertisement Route; and
in response to determining the IP-VRF attributes are carded in the EVPN MAC/IP Advertisement Route, add, based on information in the EVPN MAC/IP Advertisement Route, an IP route to an IP-VRF table, and
add a MAC entry to a MAC-VRF table identified by a Border Gateway Protocol (BGP) target of the MAC address.

11. The network device of claim 10, further comprising instructions, which when executed by the at least one processor, causes the at least one processor to:
in response to determining the IP-VRF attributes are not carried in the EVPN MAC/IP Advertisement Route, add, based on the information in the EVPN MAC/IP Advertisement Route, an Address Resolution Protocol (ARP) entry to an ARP table, the ARP entry including at least one of a MAC address and an IP address from the received the EVPN MAC/IP Advertisement Route.

12. The network device of claim 11, further comprising instructions, which when executed by the at least one processor, causes the at least one processor to:
building, based on the information, a second EVPN MAC/IP Advertisement Route; and
advertise the second EVPN MAC/IP Advertisement Route.

13. The network device of claim 12, wherein the second EVPN MAC/IP Advertisement Route is advertised with two route targets, one for MAC-VRF and one for IP-VRF.

14. The network device of claim 10, wherein adding the IP route with Virtual Route Forwarding (VRF) to the IP-VRF table is per VXLAN Network Identifier (VNI) encapsulation.

15. The network device of claim 10, wherein the information is at least one of Layer 2 information or Layer 3 information.

16. The network device of claim 10, wherein receiving the EVPN MAC/IP Advertisement Route occurs at an ingress switch.

17. The network device of claim 10, further comprising instructions, which when executed by the at least one processor, causes the at least one processor to:
building, based on the information, a second EVPN MAC/IP Advertisement Route; and
advertise the second EVPN MAC/IP Advertisement Route.

18. The network device of claim 17, wherein the second EVPN MAC/IP Advertisement Route is advertised with two route targets, one for MAC-VRF and one for IP-VRF.

19. At least one non-transitory computer-readable medium storing instructions, which when executed by at least one processor, causes the at least one processor to:
receive an Ethernet Virtual Private Network (EVPN) Media Access Control/Internet Protocol (MAC/IP) Advertisement Route;
examine the EVPN MAC/IP Advertisement Route;
determine that Internet Protocol Virtual Route Forwarding (IP-VRF) attributes are carried in the EVPN MAC/IP Advertisement Route; and
in response to determining the IP-VRF attributes are carried in the EVPN MAC/IP Advertisement Route, add, based on information in the EVPN MAC/IP Advertisement Route, an IP route to an IP-VRF table, and
add a MAC entry to a MAC-VRF table identified by a Border Gateway Protocol (BGP) target of the MAC address.

20. The at least one non-transitory computer-readable medium of claim 19, further comprising instructions, which when executed by the at least one processor, causes the at least one processor to:
building, based on the information, a second EVPN MAC/IP Advertisement Route; and
advertise the second EVPN MAC/IP Advertisement Route.

* * * * *